United States Patent Office 3,562,250
Patented Feb. 9, 1971

3,562,250
2',5'-DIDEOXY-5'-FLUORO NUCLEOSIDES AND
PROCESS FOR PREPARING SAME
Peter Langen and Gotthard Kowollik, Berlin, Germany,
assignors to Deutsche Akademie der Wissenschaften Zu
Berlin, Berlin-Adlershof, Germany
No Drawing. Filed July 30, 1968, Ser. No. 748,595
Int. Cl. C07d 51/52, 51/54
U.S. Cl. 260—211.5
10 Claims

ABSTRACT OF THE DISCLOSURE

A cytostatic composition capable of substantially inhibiting the DNA synthesis of ascites tumor cells in vitro, having the formula:

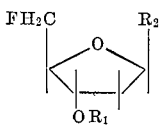

wherein $R_1$ is a hydrogen atom or an acetyl radical and $R_2$ is selected from the group consisting of 5-alkyl and 5-halogen substituted 2,4-dihydroxy-pyrimidine, 5-alkyl and 5-halogen substituted 2-hydroxy-4-amino-pyrimidine, and purine substituted in 2-position, 6-position or 2 and 6 position with an amine or hydroxyl group.

These compounds may be obtained by reacting 5'-arylsulphonyl- or 5'-mesyl-substituted 2'-deoxyribonucleoside in a solvent medium with an alkali metal fluoride, separating the thereby-formed alkali metal arylsulphonate from the residual reaction mixture, evaporating the residual reaction mixture at reduced pressure, and recovering the compound from the dry residue by taking up the dry residue with a mixture of polar and non-polar solvents, followed by chromatographic separation of the compounds from the thus-formed solution.

BACKGROUND OF THE INVENTION

The present invention is concerned with new cytostatically active 5'-deoxy-5'-fluoro-substituted deoxyribonucleosides which are capable in vitro to cause a significant inhibition of the DNA synthesis in ascites tumor cells, and the present invention is also concerned with a method of producing these novel cytostatically active compounds.

SUMMARY OF THE INVENTION

According to the present invention, a compound of the formula:

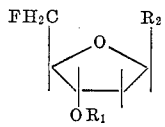

wherein $R_1$ is a hydrogen atom or an acetyl radical and $R_2$ is selected from the group consisting of 5-alkyl and 5-halogen substituted 2,4-dihydroxy-pyrimidine, 5-alkyl and 5-halogen substituted 2-hydroxy-4-amino-pyrimidine, and purine substituted in 2-position, 6-position or 2 and 6 position with an amine or hydroxyl group, is produced by reacting an optionally acetylated 5'-arylsulphonyl- or 1-mesyl-substituted 2'-deoxyribonucleoside with an alkali metal fluoride, separating precipitated alkali metal arylsulphonate from the reaction mixture; evaporating the residual reaction mixture at reduced pressure; and recovering said compound from the dry residue.

The above reaction is carried out in a solvent medium and the desired compound is recovered by taking up the dry residue with a mixture of a polar and a non-polar solvent, followed by subjecting the thus-obtained solution to chromatographic separation by multiple column chromatography which preferably is carried out on silica gel.

Preferably, the reacting is carried out for a period of between about 15 minutes and 5 hours at a temperature of between about 50 and 160° C., and most preferably, for a period of between about 30 minutes and 2 hours at a temperature of between about 130 and 150° C.

DESCRIPTION OF THE PREFERRED
EMBODIMENTS

The present invention is concerned with new cytostatically active 5'-deoxy-5'-fluoro-substituted deoxy-ribonucleosides and with the preparation thereof.

The new 5'-deoxy-5'-fluoro-substituted deoxyribonucleosides according to the present invention are compounds of the general formula:

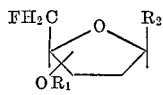

wherein $R_1$ is a hydrogen atom or an acetyl radical and $R_2$ is a residue of the purine or pyrimidine series selected from the group consisting of 5-alkyl or 5-halogen substituted 2,4-dihydroxy and 2-hydroxy-4-amino-pyrimidine, and purine substituted with an amino or hydroxyl group in 2 or 6 or 2 and 6 position.

As examples of substituent $R_2$ of the purine or pyrimidine series, there may be mentioned 1-thyminyl, 1-uracilyl, 1-(5-halouracilyl), 1-cytidyl, 9-adenyl and 9-guanyl radicals.

It is known from carbohydrate chemistry that monosaccharides which are tosylated or mesylated on primary or secondary hydroxyl groups may be converted into fluorine-containing derivatives by reaction with potassium fluoride. Thus, for example, 2,3-isopropylidene-5-mesylribofuranose methyl glycoside may be converted, by the action of potassium fluoride dihydrate in methanol, into the corresponding 5-fluoro derivative, which, after conversion into 5-fluoro-2,3-diacetyl-ribofuranosyl chloride, may be condensed with pyrimidine or purine derivatives according to the mercury process to give fluorine-containing ribonucleosides.

The use of this process or of similar condensation processes is unknown in the deoxyribonucleoside series and, due to the absence of the directing influence of the 2'-acetoxy group, it has to be assumed by those skilled in the art that, in contradistinction to the ribonucleosides, it would lead to the formation of α- and β-anomers which generally can be separated only with great difficulties. Therefore, this route for the preparation of 5'-deoxy-5'-fluoro-substituted deoxyribonucleosides would appear hardly expedient since, in addition, the desoxyribose required as starting material generally is not readily available.

According to the present invention, a simple process for the preparation of 5' - desoxy - 5' - fluoro - desoxyribonucleosides is proposed which starts from naturally-occurring or readily obtainable 2' - deoxyribonucleosides.

According to the present invention, 5' - arylsulphonyl or 5' - mesyl - substituted 2' - deoxyribonucleosides which may or may not be acetylated are reacted with alkali metal fluorides preferably for periods from 15 minutes to 5 hours, and most preferably between 30 minutes and 2 hours. The reaction is carried out in a solvent such as acetamide, dimethyl acetamide, glycol or methanol, preferably at a temperature of 50 to 160° C., and most preferably of 130 to 150° C.

Suitable solvents include lower amines which may be alkylated at the nitrogen atom, and the lower mono and polyvalent alcohols (the term "lower" denoting up to five carbon atoms).

In some cases, it is advisable first to protect the 3'-hydroxyl group by previous acetylation. After the reaction, the acetyl group is easy to remove.

The reaction time depends upon the nature of the solvent used and upon the reaction temperature and becomes the shorter with increasing temperatures.

After cooling, the reaction mixture is freed from precipitated alkali metal aryl-sulphonate and subsequently evaporated in vacuo. After taking up the evaporation residue in a solvent mixture, for which purpose a mixture of chloroform and an alcohol is especially suitable, the reaction mixture is separated into its components by multiple column chromatography, preferably on silica gel.

Suitable solvent mixtures include a polar and a nonpolar constituent, whereby the polar constituent preferably is a lower alcohol or ketone with up to 5 carbon atoms, and the non-polar constitutent a lower chlorinated hydrocarbon. The ratio of polar to non-polar constituents preferably is between 5:5 and 1:9.

Suitable solvent mixtures include, for instance, chloroform/methanol 9:1, chloroform/ethanol 8:2 and chloroform/acetone 5:5.

The process according to the present invention renders possible, in a simple manner, the preparation of, for example, 5' - deoxy - 5' - fluorothymidine, 2',5' - dideoxy - 5' - fluoro - 5 - odouridine, 2',5' - dideoxy - 5' - fluorocytidine and 3' - O - acetyl - 5' - deoxy - 5' - fluorothymidine.

The new compounds obtained according to the present invention exhibit a surprisingly strong inhibiting action on the DNA synthesis and, consequently, have a cytostatic effectiveness. Thus, for example, 5' - desoxy - 5' - fluorothymidine inhibits the DNA syntesis of Ehrlich's ascites tumor cells in vitro, measured by the incorporation of radioactive phosphate, as well as the in vitro growth of tumor cells.

The following example is given as illustrative only without intending to limit the invention to the specific details thereof.

EXAMPLE 4 grams 5' - O - tosyl - thymidine are heated to 150° C. for 1 hour in a closed vessel with the same amount by weight of potassium fluoride dihydrate in 100 cc. methanol. The reaction mixture is thereafter cooled rapidly and separated from the precipitated crystalline slurry of potassium toluenesulphonate. The filtrate is evaporated in vacuo to dryness and the residue taken up in 30 cc. of a solvent mixture of chloroform and ethanol (8:2). After standing for some time, further crystalline material precipitates and is also separated. The filtrate is absorbed in known manner on 750 g. silica gel (0.2-0.5 mm. for the column chromatography) and chromatographed with the above-mentioned solvent mixture (chloroform-ethanol, 8:2) for the separation of unreacted 5'-O-tosyl-thymidine and of small amounts of thymine and thymidine. The eluates are examined by thin layer chromatograph and homogenous fractions are combined. There are obtained 0.97 g. of mixture of 5'-deoxy-5'-fluorothymidine and two (not identified) other substances which appeared homogeneous by means of thin layer chromatography using chloroform/ethanol (8:2). The latter are separated by further column chromatography on 400 g. silica gel using ethyl acetate/ispropanol/water (12:1:6) as eluant. There are obtained 0.28 g. (11% of theory) 5'-deoxy-5'-fluoro-thymidine which is recrystallized from methanol. By working up the chromatographic intermediate fractions, there can be obtained a further amount of the desired product so that the total yield (referred to the 5' - O - tosyl - thymidine used as starting material) amounts to 15% of the theoretical yield. The compound is obtained in the form of colorless crystals with a melting point of 204–206° C. $\lambda_{max}$ 266 mm., $\epsilon=9,880$; $\lambda_{min}$ 233 mm., $\epsilon=3,100$. The corresponding 3' - O - acetyl derivative has a melting point of 145.5–146° C.

When carrying out a corresponding reaction under reflux conditions (bath temperature 100° C.), after 48 hours 15% of the theoretical yield of the 5' - deoxy - 5'-fluorothymidine could be determined by means of thin layer chromatography.

At a concentration of $1.4 \times 10^{-4}$ m., 5' - deoxy - 5'-fluorothymidine causes a 50% inhibition of the DNA synthesis of ascites tumor cells in vitro, measured by the incorporation of radioactive phosphate. At a concentration of $10^{-3}$ m. it inhibits almost completely the growth of this type of cell in cell cultures.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A compound of the formula:

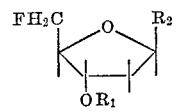

wherein $R_1$ is a hydrogen atom or an acetyl radical and $R_2$ is selected from the group consiting of 5- methyl - 2,4-dihydroxy - pyrimidine, 5 - iodo - 2,4 - dihydroxy - pyrimidine, 5 - methyl - 2 - hydroxy - 4 - amino - pyrimidine, 5 - iodo - 2 - hydroxy - 4 - aminopyrimidine, 2 - amino-6 - drydroxy - purine and 6 - amino - purine.

2. A compound as defined in claim 1, said compound being 5'-deoxy-5'-fluorothymidine.

3. A compound as defined in claim 1, said compound being 3'-O-acetyl-5'-deoxy-5'-fluorothymidine.

4. A compound as defined in claim 1, said compound being 2',5'-dideoxy-5'-fluoro-5-iodouridine.

5. A compound as defined in claim 1, said compound being 2',5'-dideoxy-5'-fluorocytidine.

6. A method for the preparation of a compound of the formula

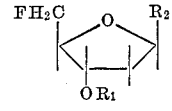

wherein $R_1$ is a hydrogen atom or an acetyl radical and $R_2$ is selected from the group consisting of 5-methyl-2,4-dihydroxy-pyrimidine, 5 - iodo-2,4-dihydroxy-pyrimidine, 5 - methyl - 2 - hydroxy-4-amino-pyrimidine, 5-iodo-2-hydroxy-4-amino-pyrimidine, 2-amino-6-hydroxy-purine and 6-amino-purine, comprising the steps of reacting an optionally acetylated 5'-arylsulphonyl- or 5'-mesyl-substituted 2'-deoxyribonucleoside with an alkali metal fluoride, separating precipitated alkali metal aryl-sulphonate from the reaction mixture; evaporating the residual reaction mixture at reduced pressure; and recovering said compound from the dry residue.

7. A method as defined in claim 6, wherein said reaction is carried out in a solvent medium, and said compound is recovered by taking up said dry residue with a mixture of polar and non-polar solvents, and subjecting the thus-formed solution to chromatographic separation.

8. A method as defined in claim 6, wherein the polar constituent of said mixture of polar and non-polar solvents is a lower alcohol or ketone, and the non-polar constituent of said solvent mixture is a lower chlorinated hydrocarbon.

9. A method as defined in claim 7, wherein said reaction is carried out for between about 15 minutes and 5 hours at a temperature between 50 and 160° C.

10. A method as defined in claim 7, wherein said solvent medium is selected from the group consisting of acetamide, dimethyl acetamide, glycol and methanol.

References Cited
UNITED STATES PATENTS

| | | | |
|---|---|---|---|
| 3,277,077 | 10/1966 | Holly et al. | 260—211.5 |
| 3,282,921 | 11/1966 | Verheyden et al. | 260—211.5 |
| 3,287,232 | 11/1966 | Mitsugi et al. | 260—211.5 |
| 3,309,358 | 3/1967 | Hanze | 260—211.5 |
| 3,346,560 | 10/1967 | Boxer | 260—211.5 |

ELBERT L. ROBERTS, Primary Examiner

J. R. BROWN, Assistant Examiner

U.S. Cl. X.R.

424—180